United States Patent
Stamp et al.

(10) Patent No.: US 12,287,877 B1
(45) Date of Patent: Apr. 29, 2025

(54) DETERMINING FALSE POSITIVES OF FILE CHANGE EVENTS DETECTED BY FILE INTEGRITY MONITORING TOOLS

(71) Applicant: Wells Fargo Bank, N.A., San Francisco, CA (US)

(72) Inventors: Christopher Sean Michael Stamp, Austin, TX (US); Daniel Fricano, Round Hill, VA (US); Kevin Michael Wurzer, Richfield, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 253 days.

(21) Appl. No.: 18/048,324

(22) Filed: Oct. 20, 2022

Related U.S. Application Data

(60) Provisional application No. 63/368,229, filed on Jul. 12, 2022.

(51) Int. Cl.
*G06F 21/56* (2013.01)
*G06F 16/23* (2019.01)

(52) U.S. Cl.
CPC ........ *G06F 21/565* (2013.01); *G06F 16/2358* (2019.01); *G06F 2221/033* (2013.01)

(58) Field of Classification Search
CPC ............... G06F 21/565; G06F 16/2358; G06F 2221/033
USPC .......................................................... 726/24
See application file for complete search history.

(56) References Cited

U.S. PATENT DOCUMENTS

| | | | |
|---|---|---|---|
| 7,032,114 B1 | 4/2006 | Moran | |
| 8,060,889 B2 | 11/2011 | Sim-Tang | |
| 8,978,137 B2 | 3/2015 | Friedrichs et al. | |
| 8,997,201 B2 | 3/2015 | Wotring | |
| 9,166,994 B2 | 10/2015 | Ward et al. | |
| 9,519,775 B2 | 12/2016 | Sridhara et al. | |
| 10,554,678 B2 | 2/2020 | Miller et al. | |
| 10,581,851 B1 * | 3/2020 | File | G06N 20/00 |
| 11,153,333 B1 * | 10/2021 | Hermoni | G06F 11/0787 |

(Continued)

OTHER PUBLICATIONS

Abela, "How to eliminate false positives in file integrity monitoring on WordPress", Security Boulevard, Jan. 16, 2020, 8 pp., URL: https://securityboulevard.com/2020/01/how-to-eliminate-false-positives-in-file-integrity-monitoring-on-wordpress/.

(Continued)

*Primary Examiner* — Bryan F Wright
(74) *Attorney, Agent, or Firm* — Shumaker & Sieffert, P.A.

(57) ABSTRACT

A system comprises a memory and one or more processors in communication with the memory. The one or more processors may be configured to obtain information associated with one or more authorized file changes and store the information associated with one or more authorized file changes in a first index. The processors may be further configured to obtain one or more file change events and enrich the one or more file change events with the information associated with one or more authorized file changes from the first index. The processors may also be configured to store the one or more file change events enriched with the information associated with one or more authorized file changes in a second index, and based on the enriched data stored in the second index, output an indication that the one or more file change events are false positives.

20 Claims, 4 Drawing Sheets

(56) References Cited

U.S. PATENT DOCUMENTS

2009/0094462 A1* 4/2009 Madduri .............. G06F 21/572
  713/182
2010/0228750 A1 9/2010 Solin

OTHER PUBLICATIONS

Breier et al., "A Dynamic Rule Creation Based Anomaly Detection Method for Identifying Security Breaches in Log Records", vol. 94, Springer Science+Business Media New York, Nov. 16, 2015, pp. 497-511.

Cisco, "Cisco Advanced Malware Protection", 2016, 6 pp., Retrieved from the Internet on Jan. 19, 2023 from URL: https://www.connection.com/~/media/pdfs/brands/c/cisco/cisco-security-amp-solution-overview.pdf?la=en.

Kim et al., "Experiences with Tripwire: Using Integrity Checkers for Intrusion Detection", Department of Computer Science Technical Reports, Feb. 21, 1994, p. 13.

Lakhani, "Applying Retrospective Network Analysis to Disrupt the Cyber Kill Chain", SS8, 5 pp., Retrieved from the Internet on Jan. 19, 2023 from URL: https://www.nist.gov/system/files/documents/2016/09/16/ss8_rfi_response.pdf.

\* cited by examiner

DETERMINING FALSE POSITIVES OF FILE CHANGE EVENTS DETECTED BY FILE INTEGRITY MONITORING TOOLS

This application claims the benefit of U.S. Provisional Application No. 63/368,229, filed 12 Jul. 2022, the entire contents of which is incorporated herein by reference.

TECHNICAL FIELD

The disclosure relates to computing devices executing software applications.

BACKGROUND

A computing system typically includes an operating system and application software files. The computing system may use file integrity monitoring (FIM) that provides validation of the integrity of the operating system and application software files. For example, FIM tools monitor system files, directories, operating system components, network devices, etc., to detect changes to the files (e.g., altered files, updated files, etc.), which may indicate potential malicious or suspicious activity. In response to detecting any file changes, FIM tools generate events that indicate detected file changes, referred to as file change events.

FIM tools are unaware of the business context behind file change events and may generate file change events for authorized file changes. Ordinarily, an administrator must have understanding of the business context behind authorized file changes to examine each of the file change events to identify authorized file changes from among the file change events. For a large enterprise, FIM tools may generate a large number of file change events, which requires the administrator to examine each of the file change events, which is time consuming and prone to error.

SUMMARY

In general, techniques are described for a system for reducing false positives from file integrity monitoring (FIM) tools. In some instances, FIM tools (referred to herein as simply "FIM") may generate file change events for authorized changes in the computing system, referred to herein as "false positives." To reduce false positives to file change events, the techniques describe, in some examples, a system including a configuration management system integrated with FIM to reduce false positives of file change events detected by the FIM.

A configuration management system is used to establish and maintain the consistency of a system's performance, and functional and physical attributes, with the system's configured requirements, design, and operational information throughout the system's life. For example, a configuration management system is used to manage authorized changes throughout the lifecycle of systems. A configuration management system may include one or more configuration management databases (CMDBs) to track the state of resources in the system, such as the installation of a software package, changes to an existing software package, etc. The configuration management databases store information associated with authorized changes, such as change requests, one or more incident tasks, one or more assets associated with the change requests and/or incident tasks (referred to herein as "related assets"). The information associated with authorized changes is referred to herein as "business context information" or "authorized file changes information." The system uses the authorized file changes information to determine whether file change events detected by the FIM are incorrectly identified as unauthorized changes. For example, the system may integrate (e.g., "enrich") a file change event with authorized file changes information if one or more fields of the file change event match one or more fields of the authorized file changes information. Based on the file change events enriched with authorized file changes information, the system may output an indication of the file change events that have been determined to be false positives (e.g., authorized file changes).

The techniques may provide one or more technical advantages. For example, by integrating a configuration management system with the FIM, the system may reduce the number of false positives of detected file change events, thereby reducing the number of file change events determined to be potentially malicious or suspicious. An administrator of the computing system may therefore focus the review of file change events for any malicious activity and may do so without needing to be familiar with the business context information of authorized changes.

In an example, this disclosure describes a system comprising a memory; and one or more processors in communication with the memory, the one or more processors configured to: obtain information associated with one or more authorized file changes; store the information associated with one or more authorized file changes in a first index; obtain one or more file change events; enrich the one or more file change events with the information associated with one or more authorized file changes from the first index, wherein enriching the one or more file change events with the information associated with one or more authorized file changes from the first index is based on a determination that one or more fields of the one or more file change events match one or more fields of the information associated with one or more authorized file changes; store the one or more file change events enriched with the information associated with one or more authorized file changes in a second index; and output, based on the one or more file change events enriched with the information associated with one or more authorized file changes stored in the second index, an indication that the one or more file change events are false positives.

In another example, this disclosure describes a method comprising obtaining information associated with one or more authorized file changes from a computer management system, wherein the information comprises business context information including change requests, incident tasks, resources associated with the change requests, and resources associated with the incident tasks; storing the business context information in a first index; obtaining one or more file change events; enriching the one or more file change events with the business context information from the first index, wherein enriching the one or more file change events with the business context information from the first index is based on a determination that one or more fields of the one or more file change events match one or more fields of the business context information; storing the one or more file change events enriched with the business context information in a second index; and outputting, based on the one or more file change events enriched with the business context information stored in the second index, an indication that the one or more file change events are false positives.

In another example, this disclosure describes a computer readable medium comprising instructions that when executed cause one or more processors to obtain the information associated with one or more authorized file changes;

store the information associated with one or more authorized file changes in a first index; obtain one or more file change events; enrich the one or more file change events with the information associated with one or more authorized file changes from the first index, wherein enriching the one or more file change events with the information associated with one or more authorized file changes from the first index is based on a determination that one or more fields of the one or more file change events match one or more fields of the information associated with one or more authorized file changes; store the one or more file change events enriched with the information associated with one or more authorized file changes in a second index; and output, based on the one or more file change events enriched with the information associated with one or more authorized file changes stored in the second index, an indication that the one or more file change events are false positives.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
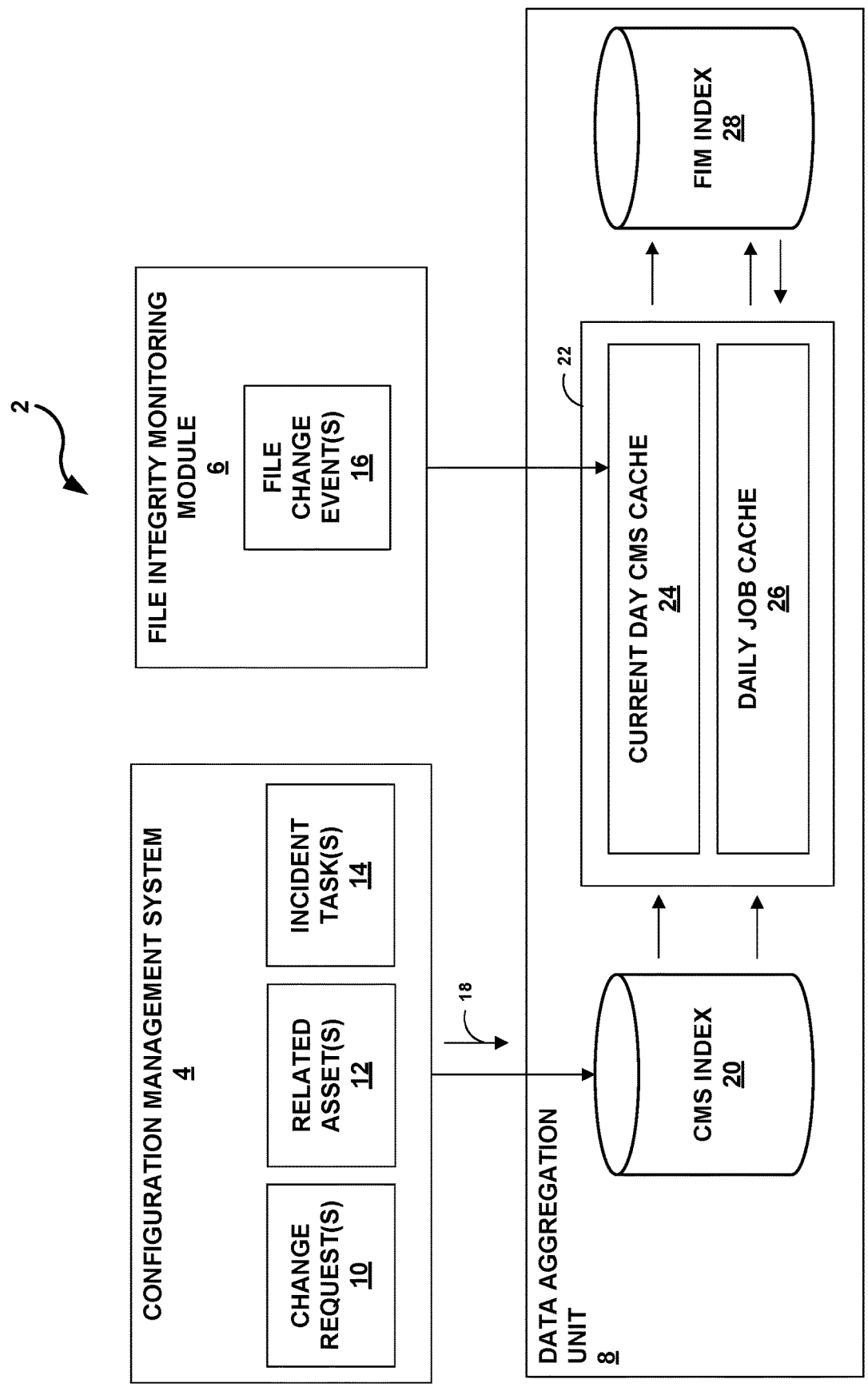
FIG. 1 is a block diagram illustrating an example computer-based system for reducing false positives from file integrity monitoring tools, in accordance with the techniques described in this disclosure.

FIG. 1 is a block diagram illustrating an example computer-based system 2 for reducing false positives from file integrity monitoring tools, in accordance with the techniques described in this disclosure. As illustrated in FIG. 1, system 2 includes a configuration management system (CMS) 4, file integrity monitoring module 6, and data aggregation unit 8.

CMS 4 may represent an example of any configuration management system, such as an Information Technology (IT) management system for an organization. CMS 4 may provide a system to manage, for example, IT services for a computing system, such as troubleshooting, software releases, or the like. IT services, such as change requests and/or incident tasks (e.g., represented by IT tickets), may include authorized changes to files in the computing system (e.g., configuration files, application software files, etc.). In this example, CMS 4 includes one or more data repositories that are configured to store information associated with authorized changes to the computing system. For example, CMS 4 may include change requests 10 that store information associated with one or more change requests, incident tasks 14 that stores information associated with one or more incident tasks, and related assets 12 that stores information associated with one or more assets associated with change requests and/or incident tasks.

Change requests 10 may include information associated with one or more requests to add, modify, or remove files of the computing system, or any other requests to make authorized changes to files in the computing system. Information associated with change requests may specify, for example, when a change request started, when the change request ended, a description of the current state of the change request (e.g., current phase of the change request), and/or other information associated with an authorized change request, such as an IT ticket number, business information (e.g., the business department making changes), information of one or more users associated with the change request, confidentiality of data, etc. The information specifying when a change request started or ended may include a date and/or time the change request started or ended.

Incident tasks 14 may include information associated with one or more tasks to resolve an incident, such as an occurrence of a disruption or loss of operations, services, or functions. Tasks may include making authorized changes to files in the computing system. Information associated with incident tasks may specify, for example, when a task is opened, when the task is closed, a description of the current state of the incident task (e.g., current phase of the incident task), and/or other information associated with the incident task, such as an IT ticket number, business information (e.g., the business department making changes), information of one or more users associated with the incident task, confidentiality of data, etc. The information specifying when an incident task opened or closed may include a date and/or time the incident task opened or closed.

Related assets 12 may include information associated with one or more assets associated with change requests and/or incident tasks. An asset may include a computing device, such as a server, or other device associated with change requests and/or incident tasks. Information associated with related assets may include information specifying details of a device that hosts files that were changed, an IT ticket number, a time when files hosted on the device changed, and/or other information associated with the device.

The information in change requests 10, related assets 12, and incident tasks 14 may collectively be referred to as "business context information" or "authorized file changes information." The authorized file changes information is not limited to change requests, incident tasks, and/or related assets, and may include other information associated with authorized file changes.

File integrity monitoring (FIM) module 6 may represent a control or process that detects changes in file systems of an operating system or application software. Some changes may impact system integrity and expose the computing system to threats or malicious activity. FIM module 6 may detect changes in the file systems and in response, generate one or more file change events 16 that provide indications of the detected change events to files within the computing system.

In accordance with the techniques described in this disclosure, computer-based system 2 includes a data aggregation unit 8 that may integrate information associated with authorized file changes (represented by "authorized file changes information 18" in FIG. 1) from CMS 4 and file change events 16 from FIM module 6 to indicate the file change events 16 detected by FIM module 6 are false positives. By integrating file change events 16 with information associated with authorized file changes, the system may reduce the number of false positives of detected file change events, thereby reducing the number of file change events determined to be potentially malicious or suspicious. An administrator of the computing system may therefore focus the review of file change events for any malicious activity and may do so without needing to be familiar with the business context information of authorized changes.

As one example, data aggregation unit 8 may include an ingest pipeline, such as an Elasticsearch ingest pipeline provided by Elastic N.V., to ingest data from data sources (e.g., logs, system metrics, web applications, etc.), such as from CMS 4 and FIM module 6, and enrich the ingested data before indexing the data in FIM index 28. For instance, data aggregation unit 8 may obtain data from CMS 4, such as information in change requests 10, related assets 12, and incident tasks 14, by ingesting the data into the ingest pipeline via one or more interfaces, such as a representational state transfer (RESTful) application programming interface (API) to transmit the data in the form of JavaScript Object Notation (JSON) documents, data connectors, or other tools to obtain data from CMS 4 (e.g., Logstash, Beats, etc.).

Data aggregation unit 8 may store the obtained information from CMS 4 in CMS index 20. CMS index 20 provides an index of authorized file changes information 18 obtained from CMS 4. CMS index 20 may represent one or more source indexes that store data that may be added to incoming documents, such as file change events 16. In some examples, data aggregation unit 8 may enrich the authorized file changes information 18 prior to storing the authorized file changes information 18 in CMS index 20. Data enrichment may include adding information to the data, integrating data, and/or other process of enhancing, refining, and/or improving the data. As further described below, data aggregation unit 8 may enrich the authorized file changes information 18, e.g., by mapping how one or more data fields of change requests 10, related assets 12, and/or incident tasks 14 are indexed and stored within CMS index 20. For instance, information in related assets 12 may be mapped to information in changed requests 10 based on a matching IT ticket number. Data aggregation unit 8 may store the enriched data (e.g., related asset information enriched with change request/task incident information) in CMS index 20. In some examples, data aggregation unit 8 may store the enriched data as JSON documents.

Data aggregation unit 8 may enrich file change events 16 with the data in CMS index 20. For example, data aggregation unit 8 may implement one or more queries to determine whether one or more file change events 16 match information in CMS index 20, and if there is a match, enrich the one or more file change events 16 with the authorized file changes information in CMS index 20. A query may be used to determine whether one or more fields of a file change event matches one or more fields of authorized file changes information in CMS index 20. As one example, data aggregation unit 8 may implement a query to determine whether any of file change events 16 occurred within a time window (e.g., start time and/or end time) of a change request. If a file change event occurred within the time window of the change request, data aggregation unit 8 may store the file change event enriched with the change request in FIM index 28. FIM index 28 may represent one or more target indexes that store the enriched data. The data stored in FIM index 28 may represent the file change events determined to be false positives (e.g., determined to be authorized file changes).

In some examples, data aggregation unit 8 may use one or more caches 22, e.g., current day CMS cache 24 and/or daily job cache 26, to enrich file change events with the authorized file changes information stored in CMS index 20. In this example, current day CMS cache 24 may represent one or more caches used to enrich file change events with the authorized file changes information from CMS index 20 that occurred in a current day. For example, current day CMS cache 24 may obtain a subset of the information stored in CMS index 20, such as change requests enriched with related assets that have a start date and/or close date of a current day. Data aggregation unit 8 may enrich file change events 16 that occurred in the current day and enrich these file change events with the enriched data in current day CMS cache 24.

Daily job cache 26 may represent one or more caches used to enrich file change events with authorized file changes information from CMS index 20 that occurred in a previous day or over a period of time (e.g., days, weeks, months, etc.). For example, daily job cache 26 may obtain change requests enriched with related assets that have a start date and/or close date of a previous week. In this example, daily job cache 26 may obtain a subset of the authorized file changes information stored in CMS index 20, such as change requests enriched with related assets that have a start date and/or close date of the previous week. Data aggregation unit 8 may perform a lookback of file change events 16 that occurred in the previous week and enrich these file change events with the enriched data in daily job cache 26.

In some examples, data aggregation unit 8 may output, based on data stored in FIM index 28, an indication that the one or more file change events are false positives. For example, data aggregation unit 8 may execute a query to perform a lookup of information in FIM index 28 and may output the data resulting from the query, such as output the data for display at a display device.

Figure 2:
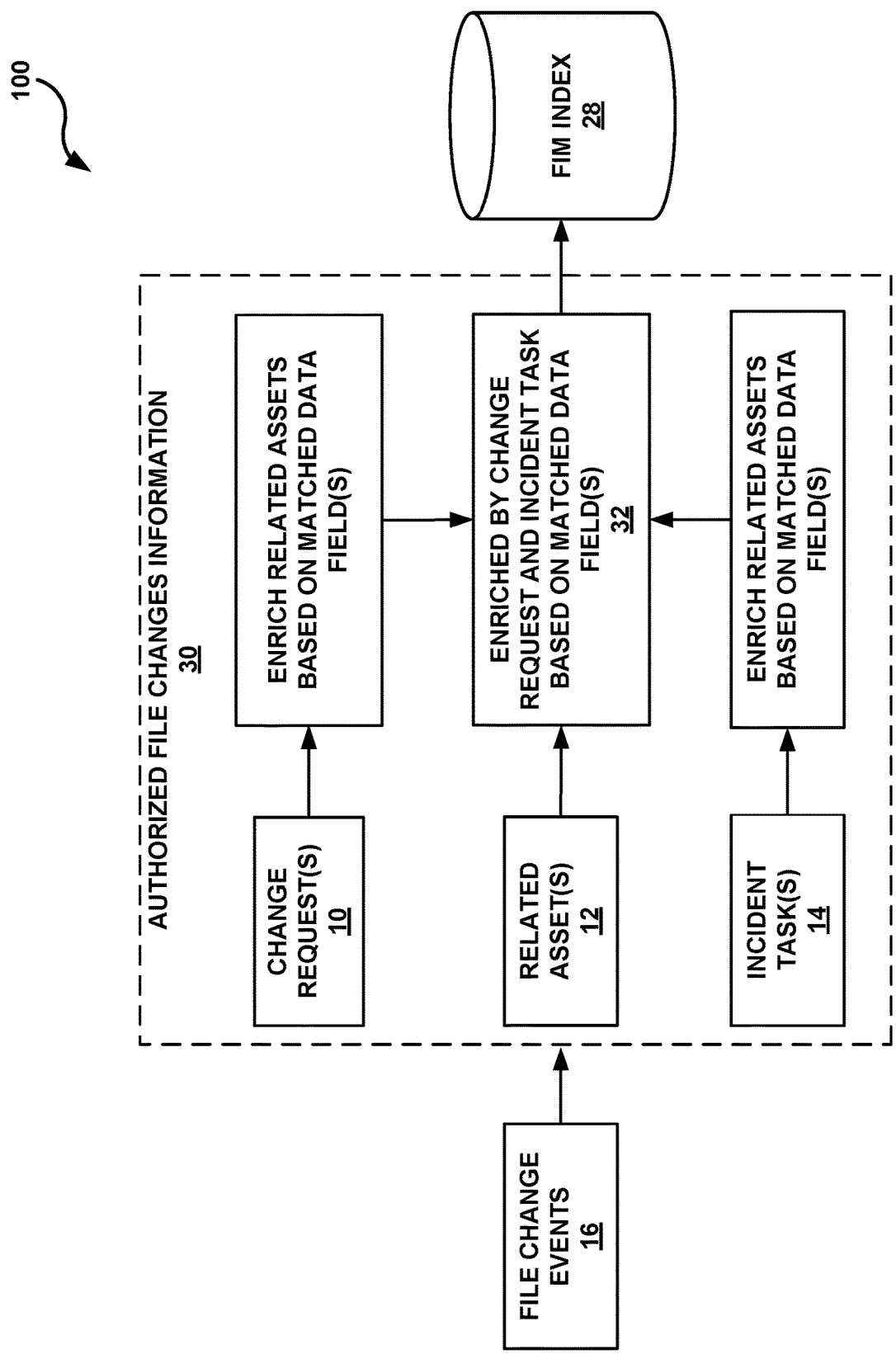
FIG. 2 is a conceptual diagram illustrating an example of a data enrichment process, in accordance with the techniques described in this disclosure.

FIG. 2 is a conceptual diagram illustrating an example of a data enrichment process, in accordance with the techniques described in this disclosure. The data enrichment process 100 of FIG. 2 may represent an example instance of a data enrichment process with respect to computer-based system 2 of FIG. 1.

Authorized file changes information 30 may represent information from CMS index 20 of FIG. 1. In this example, authorized file changes information 30, such as change requests 10, related assets 12, and incident tasks 14, may be enriched during ingestion of authorized file changes information 18. For example, data aggregation unit 8 may enrich one or more related assets 12 with one or more change requests 10 based on one or more matched data fields and additionally, or alternatively, enrich one or more related assets 12 with one or more incident tasks 14 based on one or more matched data fields (illustrated in FIG. 2 as "32").

Data aggregation unit 8 (see FIG. 1) may enrich one or more file change events 16 with authorized file changes information 30. As described above, data aggregation unit 8 may implement one or more queries, to determine whether one or more file change events 16 match authorized file changes information 30. A query may be used to determine whether one or more fields of a file change event matches one or more fields of authorized file changes information 30. As one example, data aggregation unit 8 may implement a query to determine whether any of file change events 16 occurred within a time window (e.g., start time and/or end time) of a change request and/or task incident. If a file change event occurred within the time window of the change request and/or task incident, data aggregation unit 8 may store the file change event enriched with the change request and/or task incident in FIM index 28.

Figure 3:
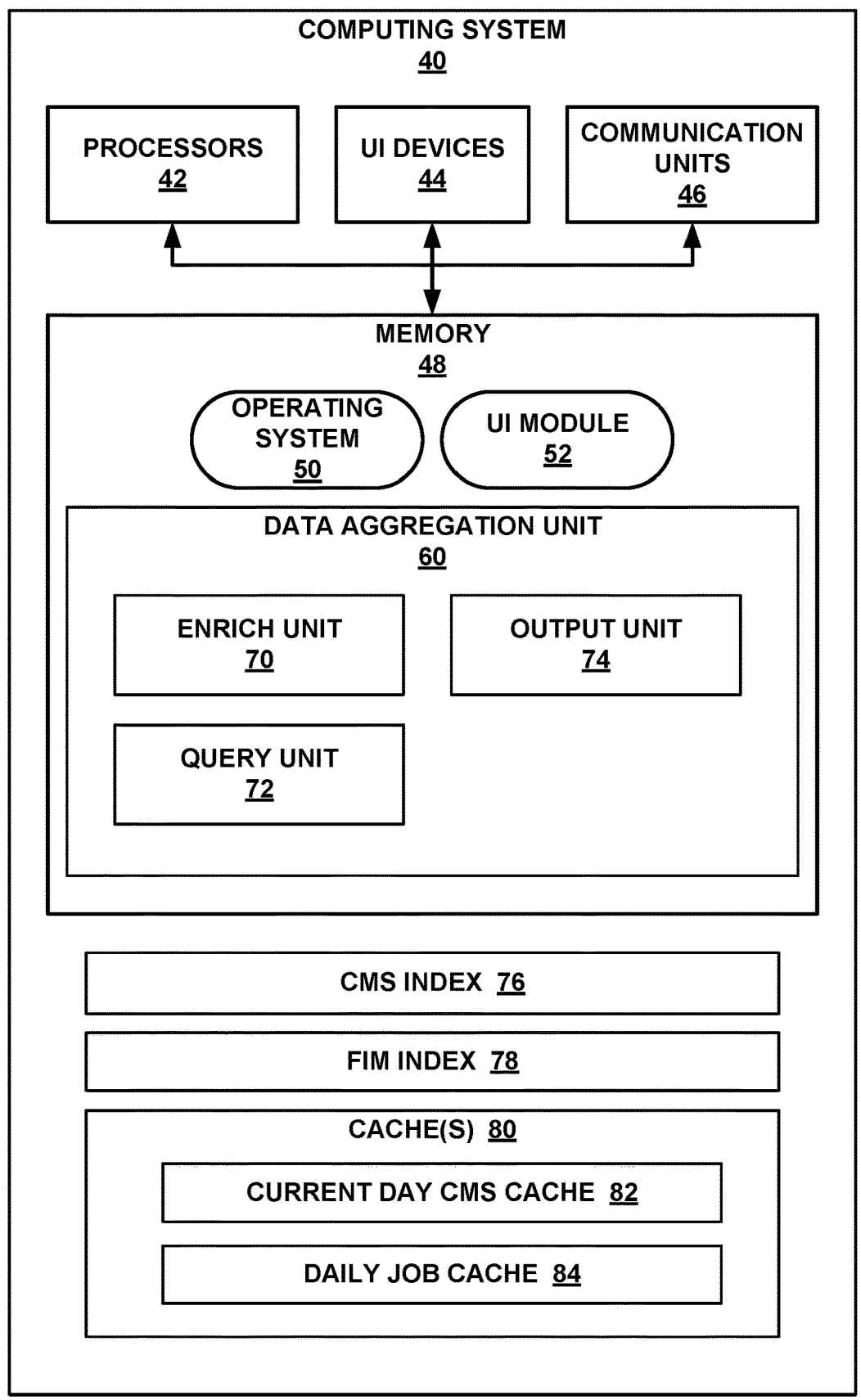
FIG. 3 is a block diagram illustrating an example computing system configured to execute a data aggregation unit for integrating information associated with authorized file changes and file change events to indicate the file change events are false positives, in accordance with the techniques of this disclosure.

FIG. 3 is a block diagram illustrating an example computing system 40 configured to execute a data aggregation unit 60 for integrating information associated with authorized file changes and file change events to indicate the file change events are false positives, in accordance with the techniques of this disclosure. Computing system 40 may comprise one or more computing devices and may include one or more processors 42 configured to execute data aggregation unit 60. In some examples, the one or more processors 42 may be included in one or more devices, e.g., multiple computing devices including one or more processors 42 configured to execute data aggregation unit 60. The architecture of computing system 40 illustrated in FIG. 3 is shown for exemplary purposes only and computing system 40 should not be limited to this architecture. In other examples, computing system 40 may be implemented and/or configured in a variety of ways.

As shown in the example of FIG. 3, computing system 40 includes one or more processors 42, one or more user interface (UI) devices 44, one or more communication units 46, and one or more memory units 48. Memory 48 of computing system 40 includes operating system 50, UI module 52, and data aggregation unit 60, which are executable by one or more processors 42. Each of the components, units or modules of computing system 40 are coupled (physically, communicatively, and/or operatively) using communication channels for inter-component communications. In some examples, the communication channels may include a system bus, a network connection, an inter-process communication data structure, or any other method for communicating data.

Processors 42, in one example, may comprise one or more processors that are configured to implement functionality and/or process instructions for execution within computing system 40. For example, processors 42 may be capable of processing instructions stored by memory 48. Processors 42 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 48 may be configured to store information within computing system 40 during operation. Memory 48 may include a computer-readable storage medium or computer-readable storage device. In some examples, memory 48 include one or more of a short-term memory or a long-term memory. Memory 48 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 48 is used to store program instructions for execution by processors 42. Memory 48 may be used by software or applications running on computing system 40 (e.g., data aggregation unit 60) to temporarily store information during program execution.

Computing system 40 may utilize communication units 46 to communicate with external devices via one or more networks or via wireless signals. Communication units 46 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing system 40 utilizes communication units 46 to wirelessly communicate with an external device.

UI devices 44 may be configured to operate as both input devices and output devices. For example, UI devices 44 may be configured to receive tactile, audio, or visual input from a user of computing system 40. In addition to receiving input from a user, UI devices 44 may be configured to provide output to a user using tactile, audio, or video stimuli. In one example, UI devices 44 may be configured to output content such as a GUI for display at a display device. UI devices 44 may include a presence-sensitive display that displays a GUI and receives input from a user using capacitive, inductive, and/or optical detection at or near the presence sensitive display.

Other examples of UI devices 44 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 44 include a speaker, a cathode ray tube (CRT) monitor, a liquid crystal display (LCD), organic light emitting diode (OLED), or any other type of device that can generate intelligible output to a user.

Computing system 40 may include additional components that, for clarity, are not shown in FIG. 3. For example, computing system 40 may include a battery to provide power to the components and devices of computing system 40. Similarly, the components of computing system 40 shown in FIG. 3 may not be necessary in every example of computing system 40.

In the example illustrated in FIG. 3, data aggregation unit 60 may be an example of data aggregation unit 8 of FIG. 1. Data aggregation unit 60 may include enrich unit 70 and query unit 72. Enrich unit 70 may be configured to enrich information associated with authorized file changes obtained from a CMS (e.g., CMS 4 of FIG. 1). For example, enrich unit 70 may enrich one or more fields of a change request and/or task incident with a related asset of the change request and/or task incident. In some examples, the enrich unit 70 may enrich one or more fields of the change request and/or task incident based on one or more matching data fields, such as an IT ticket number. Enrich unit 70 may store the authorized file changes information in CMS index 76.

Enrich unit 70 may also be configured to enrich file change events obtained from a FIM module (e.g., FIM module 6 in FIG. 1) with authorized file changes information in CMS index 76. For example, enrich unit 70 may use query unit 72 to determine whether to enrich file change events with authorized file changes information. Query unit 72 may be configured to determine whether one or more fields of file change events match one or more fields of enriched authorized file changes information. Query unit 72 may execute a query to perform a full-text search, including options for fuzzy matching, on one or more fields of file change events and determine whether the one or more fields match one or more fields of authorized file changes information. In some examples, query unit 72 may execute a query to perform a search on one or more fields of file change events and determine whether the one or more fields are within a specified range. For instance, query unit 72 may execute a query to determine whether a time field of file change events matches a time field or is within time window (e.g., start time and/or end time) of a change request. In response to a determination that a time field of the file change event matched the time field or is within the time window of the change request, query unit 72 may instruct or otherwise cause enrich unit 70 to enrich the file change event with the change request. For example, enrich unit 70 may add one or more fields of the authorized file changes information to the file change event. Enrich unit 70 is also configured to store the file change event enriched with the change request in FIM index 78.

Data aggregation unit 60 may include output unit 74 that may be configured to output, based on the information stored in FIM index 78, an indication that the one or more file change events are false positives. In some examples, output unit 74 may output a notification associated with information stored in FIM index 78, e.g., an email notification to a user that indicates a file change event is determined to be a false positive. In some examples, output unit 74 may output the information stored in FIM index 78 for display at a display device (not shown).

In the example shown, computing system 40 includes CMS index 76, FIM index 78, and one or more caches 80. In some examples, CMS index 76 may be an example of CMS index 20, FIM index 78 may be an example of FIM index 28, and one or more caches 80 may be examples of caches 22 of FIG. 1.

CMS index 76 provides an index of authorized file changes information obtained from a CMS. CMS index 76 may represent a database or any data repository configured to store data. CMS index 76 may represent one or more source indexes that store data that may be added to incoming documents, such as file change events. In some examples, enrich unit 70 may enrich the authorized file changes information prior to storing the authorized file changes information in CMS index 76. Information stored in CMS index 76 may be stored as JSON documents.

FIM index 78 provides an index of file change events enriched with authorized file changes information. FIM index 78 may represent a database or any data repository configured to store data. FIM index 78 may represent one or more target indexes that store the enriched data. The data stored in FIM index 78 may represent the file change events determined to be false positives (e.g., determined to be authorized file changes). Information stored in FIM index 78 may be stored as JSON documents.

Computing system 40 may include one or more caches 80, e.g., current day CMS cache 82 and/or daily job cache 84, that enrich unit 70 may use to enrich file change events with the authorized file changes information stored in CMS index 76. In some examples, computing system 40 may receive input from UI devices 44 that may specify the breadth of the authorized file changes information in which to enrich file change events. Computing system 40 may be configured with one or more caches 80 based on breadth of information specified by the user. In this example, current day CMS cache 82 may be an example of current day CMS cache 24 of FIG. 1. Current day CMS cache 82 may represent one or more caches used to enrich file change events with information from CMS index 76 that occurred in a current day. Daily job cache 84 may be an example of daily job cache 26 of FIG. 1. Daily job cache 84 may represent one or more caches used to enrich file change events with information from CMS index 20 that occurred in a previous day or over a period of time (e.g., days, weeks, months, etc.).

Figure 4:
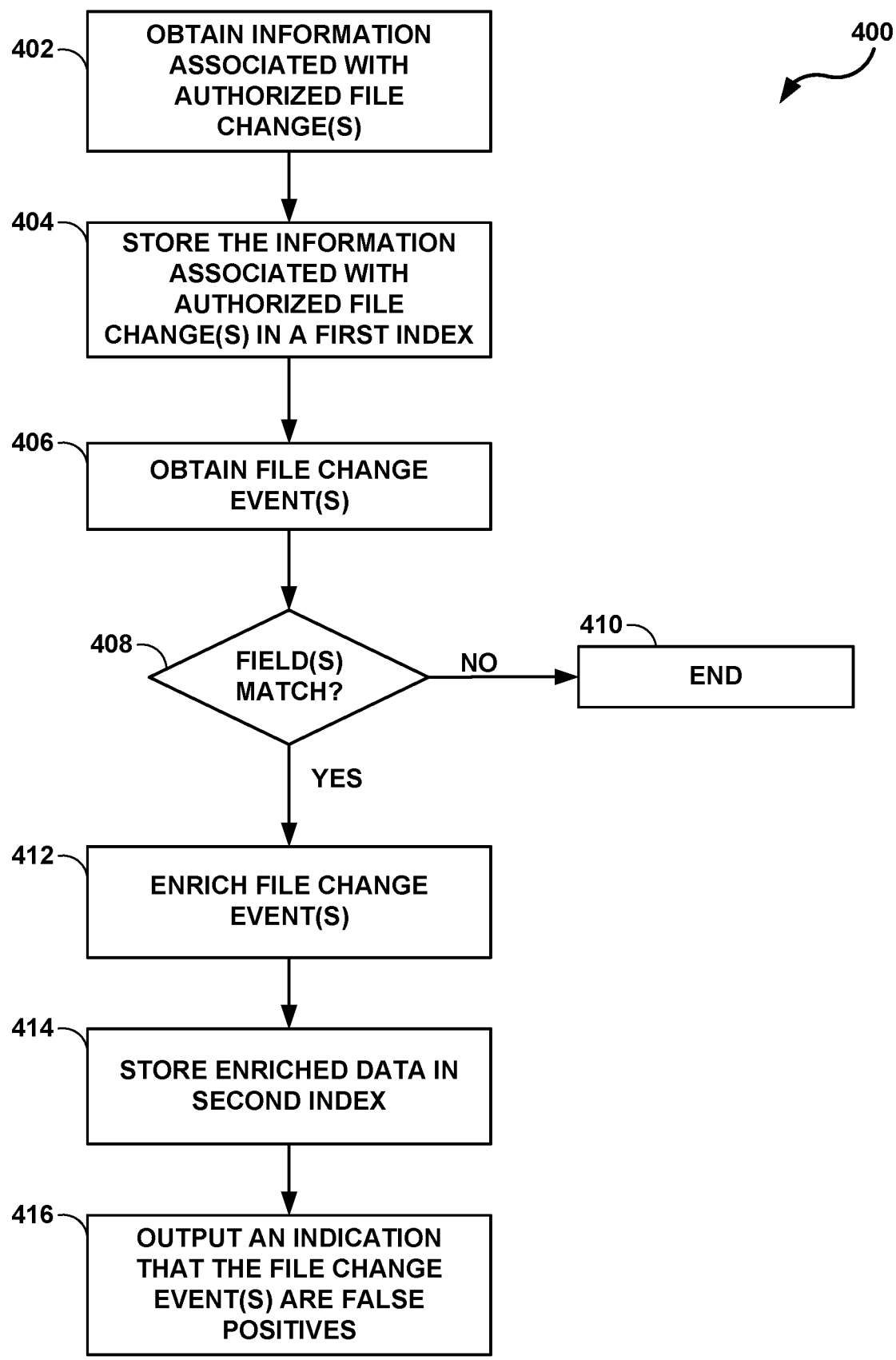
FIG. 4 is a flowchart illustrating an example method of integrating information associated with authorized file changes and file change events to indicate the file change events are false positives, in accordance with the techniques of this disclosure.

FIG. 4 is a flowchart illustrating an example method 400 of integrating information associated with authorized file changes and file change events to indicate the file change events are false positives, in accordance with the techniques of this disclosure. Although FIG. 4 is discussed using computer-based system 2 of FIG. 1 and computing system 40 of FIG. 3, it is to be understood that the methods discussed herein may include and/or utilize other systems and methods in other examples.

Computing system 40 may obtain the information associated with one or more authorized file changes (402). For example, data aggregation unit 60 of computing system 40 may obtain data from a CMS (e.g., CMS 4 of FIG. 1) by ingesting the data into the ingest pipeline via one or more interfaces, such as a RESTful API to transmit the data in the form of JSON documents, data connectors, or other tools to obtain data from the CMS (e.g., Logstash, Beats, etc.).

Computing system 40 may store the information associated with one or more authorized file changes in a first index, e.g., CMS index 76 (404). For example, data aggregation unit 60 of computing system 40 may store the obtained information from the CMS in CMS index 76. As described above, CMS index 76 provides an index of authorized file changes information obtained from the CMS. CMS index 76 may represent one or more source indexes that store data that may be added to incoming documents, such as file change events. In some examples, data aggregation unit 60 of computing system 40 may enrich the authorized file changes information prior to storing the authorized file changes information in CMS index 76, e.g., by mapping information in related assets 12 to information in changed requests 10 based on a matching IT ticket number, and/or mapping information in related assets 12 to information in incident tasks 14.

Computing system 40 may obtain one or more file change events (406) and enrich the one or more file change events with the information associated with one or more authorized file changes from the first index, wherein enriching the one or more file change events with the information associated with one or more authorized file changes from the first index is based on a determination that one or more fields of the one or more file change events match one or more fields of the information associated with one or more authorized file changes (408). For example, enrich unit 70 of data aggregation unit 60 may be configured to enrich file change events obtained from a FIM module (e.g., FIM module 6 in FIG. 1) with authorized file changes information in CMS index 76. Enrich unit 70 may use query unit 72 to determine whether one or more fields of file change events match one or more fields of authorized file changes information (e.g., whether a time field of a file change event matches or is within a time window field of a change request).

In response to a determination that one or more fields of file change events do not match one or more fields of authorized file changes information ("NO" of step 408), method 400 may end (410). In response to a determination that one or more fields of file change events match one or more fields of enriched authorized file changes information ("YES" of step 408), query unit 72 may instruct or otherwise cause enrich unit 70 to enrich the file change event with the change request (412). For example, enrich unit 70 may add one or more fields of the authorized file changes information to the file change event. Enrich unit 70 may store the file change event enriched with the authorized file changes information in a second index, e.g., FIM index 78 (414) and output, based on the one or more file change events enriched with the information associated with one or more authorized file changes stored in the second index, an indication that the one or more file change events are false positives (416).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A system comprising:
   a memory;
   one or more processors in communication with the memory, the one or more processors configured to:
      obtain information associated with one or more authorized file changes;
      store the information associated with one or more authorized file changes in a first index;
      obtain one or more file change events;
      integrate the one or more file change events with the information associated with one or more authorized file changes from the first index, one or more incident tasks associated with the one or more file change events, and one or more assets associated with the one or more file change events or the one or more incident tasks to generate integrated data,
         wherein integrating the one or more file change events is based on a determination that one or more fields of the one or more file change events match one or more fields of the information associated with one or more authorized file changes, the one or more incident tasks, or the one or more assets, and
         wherein the one or more assets comprise a device associated with the one or more file change events or the one or more task incidents;
      store the integrated data in a second index; and
      output, based on the integrated data stored in the second index, an indication that the one or more file change events are false positives.

2. The system of claim 1, wherein the information associated with one or more authorized file changes comprises information associated with at least one or more change requests, one or more task incidents, one or more assets associated with the one or more change requests, and one or more assets associated with the one or more task incidents.

3. The system of claim 1, wherein the one or more fields of the information associated with one or more authorized file changes comprises at least one of a start time of a change request, an end time of the change request, and a description of a phase of the change request.

4. The system of claim 1, wherein the one or more fields of the information associated with one or more authorized file changes comprises at least one of an open time of an incident task, a close time of the incident task, and a description of a phase of the task incident.

5. The system of claim 4, wherein the one or more fields of the information associated with one or more authorized file changes comprises at least one of a start time of a change request, an end time of the change request, business information, user information, or confidentiality of data.

6. The system of claim 1, wherein to integrate the one or more file change events with the information associated with one or more authorized change requests from the first index, the one or more incident tasks associated with the one or more file change events, and the one or more assets associated with the one or more file change events or the one or more incident tasks to generate integrated data, the one or more processors are further configured to:
  determine a time of a file change event of the one or more file change events is within a start time or an end time of a change request.

7. The system of claim 1, wherein to integrate the one or more file change events with the information associated with one or more authorized change requests from the first index, the one or more incident tasks associated with the one or more file change events, and the one or more assets associated with the one or more file change events or the one or more incident tasks to generate integrated data, the one or more processors are further configured to:
  determine a time of a file change event of the one or more file change events is within an open time or a close time of an incident task.

8. The system of claim 1,
  wherein to integrate the one or more change requests with the one or more assets, the one or more processors are further configured to integrate the one or more change requests with the one or more assets based on a ticket identifier of a ticket associated with at least one of the one or more change requests; and
  wherein to integrate the one or more change requests with the one or more incident tasks, the one or more processors are further configured to integrate the one or more change requests with the one or more incident tasks based on a ticket associated with at least one of the one or more incident tasks.

9. The system of claim 1, further comprising:
  a cache configured to store a subset of the information associated with one or more authorized file changes stored in the first index, and
  wherein to integrate the one or more file change events with the information associated with one or more authorized file changes from the first index, the one or more incident tasks associated with the one or more file change events, and the one or more assets associated with the one or more file change events or the one or more incident tasks to generate integrated data, the one or more processors are further configured to:
  obtain, from the cache, the subset of the information associated with one or more authorized file changes stored in the first index.

10. The system of claim 9, wherein the subset of the information associated with one or more authorized file changes stored in the first index comprises the information for a current day.

11. The system of claim 1, wherein the subset of the information associated with one or more authorized file changes stored in the first index comprises the information for a period of time.

12. A method comprising:
  obtaining information associated with one or more authorized file changes from a computer management system;
  storing the information associated with one or more authorized file changes in a first index;
  obtaining one or more file change events;
  integrating the one or more file change events with the information associated with the one or more authorized file changes from the first index, one or more incident tasks associated with the one or more file change events, and one or more assets associated with the one or more file change events or the one or more incident tasks to generate integrated data,
  wherein integrating the one or more file change events is based on a determination that one or more fields of the one or more file change events match one or more fields of the information associated with one or more authorized file changes, the one or more incident tasks, or the one or more assets,
  wherein the one or more assets comprise a device associated with the one or more file change events or the one or more incident tasks;
  storing the integrated data in a second index; and
  outputting, based on the integrated data stored in the second index, an indication that the one or more file change events are false positives.

13. The method of claim 12, wherein the information associated with one or more authorized file changes comprises information associated with at least one or more change requests, one or more task incidents, one or more assets associated with the one or more change requests, and one or more assets associated with the one or more task incidents.

14. The method of claim 12, wherein the one or more fields of the information associated with one or more authorized file changes comprises at least one of a start time of a change request, an end time of the change request, and a description of a phase of the change request.

15. The method of claim 12, wherein the one or more fields of the information associated with one or more authorized file changes comprises at least one of an open time of an incident task, a close time of the incident task, and a description of a phase of the task incident.

16. The method of claim 12, wherein the one or more fields of the information associated with one or more authorized file changes comprises at least one of a start time of a change request, an end time of the change request, business information, user information, or confidentiality of data.

17. The method of claim 12, wherein integrating the one or more file change events with the information associated with the one or more authorized file changes from the first index, the one or more incident tasks associated with the one or more file change events, and the one or more assets associated with the one or more file change events or the one or more incident tasks to generate integrated data comprises determining a time of a file change event of the one or more file change events is within a start time or an end time of a task incident.

18. The method of claim 12, wherein integrating the one or more file change events with the information associated with the one or more authorized file changes from the first index, the one or more incident tasks associated with the one or more file change events, and the one or more assets associated with the one or more file change events or the one or more incident tasks to generate integrated data comprises determining a time of a file change event of the one or more file change events is within an open time or a close time of a change request.

19. The method of claim 12,
  wherein integrating the one or more change requests with the one or more assets is based on a ticket identifier of a ticket associated with at least one of the one or more change requests; and
  wherein integrating the one or more change requests with the one or more incident tasks is based on a ticket associated with at least one of the one or more task incidents.

20. Non-transitory computer readable media comprising instructions that when executed cause one or more processors to:

obtain the information associated with one or more authorized file changes;
store the information associated with one or more authorized file changes in a first index;
obtain one or more file change events;
integrate the one or more file change events with the information associated with one or more authorized file changes from the first index, one or more incident tasks associated with the one or more file change events, and one or more assets associated with the one or more file change events or the one or more incident tasks to generate integrated data,
   wherein integrating the one or more file change events with the information associated with one or more authorized file changes from the first index is based on a determination that one or more fields of the one or more file change events match one or more fields of the information associated with one or more authorized file changes, the one or more incident tasks, or the one or more assets, and
   wherein the one or more assets comprise a device associated with the one or more file change events or the one or more incident tasks;
store the integrated data in a second index; and
output, based on the integrated data stored in the second index, an indication that the one or more file change events are false positives.

* * * * *